US012260830B2

(12) United States Patent
Lim et al.

(10) Patent No.: US 12,260,830 B2
(45) Date of Patent: Mar. 25, 2025

(54) DISPLAY APPARATUS AND CONTROLLING METHOD FOR THE SAME

(71) Applicant: SAMSUNG ELECTRONICS CO., LTD., Suwon-si (KR)

(72) Inventors: Sungjin Lim, Suwon-si (KR); Seungjun Jeong, Suwon-si (KR); Junghyun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/495,869

(22) Filed: Oct. 27, 2023

(65) Prior Publication Data

US 2024/0054962 A1 Feb. 15, 2024

Related U.S. Application Data

(63) Continuation of application No. 17/859,677, filed on Jul. 7, 2022, now Pat. No. 11,837,175, which is a (Continued)

(30) Foreign Application Priority Data

Oct. 5, 2021 (KR) ........................ 10-2021-0131874

(51) Int. Cl.
*G09G 3/3275* (2016.01)

(52) U.S. Cl.
CPC ... *G09G 3/3275* (2013.01); *G09G 2300/0842* (2013.01); *G09G 2310/08* (2013.01); *G09G 2330/026* (2013.01)

(58) Field of Classification Search
None
See application file for complete search history.

(56) References Cited

U.S. PATENT DOCUMENTS 9,886,908 B2 2/2018 Tani et al.
10,467,959 B2 11/2019 Park et al.
(Continued)

FOREIGN PATENT DOCUMENTS

JP 2007-187779 A 7/2007
JP 2009-276744 A 11/2009
(Continued)

OTHER PUBLICATIONS

International Search Report (PCT/ISA/210) and Written Opinion (PCT/ISA/237) issued by the International Searching Authority dated Oct. 25, 2022 in International Application No. PCT/KR2022/009622.

*Primary Examiner* — Robin J Mishler
*Assistant Examiner* — Amen W Bogale
(74) *Attorney, Agent, or Firm* — Sughrue Mion, PLLC

(57) ABSTRACT

A display apparatus for reducing a booting time includes: a display panel including a plurality of pixels; a timing controller configured to drive the display panel; and a at least one controller configured to control the timing controller to perform a sensing process for sensing electrical characteristics of the plurality of pixels based on power-on of the display panel, wherein the at least one controller is further configured to determine whether to perform the sensing process or skip the sensing process based on a power-off period of the display panel before the display panel is powered on.

21 Claims, 11 Drawing Sheets

Related U.S. Application Data continuation of application No. PCT/KR2022/009622, filed on Jul. 4, 2022.

(56) References Cited

U.S. PATENT DOCUMENTS

| | | | | |
|---|---|---|---|---|
| 11,004,397 | B2 | 5/2021 | Kobayashi et al. | |
| 11,308,877 | B2 | 4/2022 | Lee et al. | |
| 11,562,700 | B2 | 1/2023 | Lee et al. | |
| 11,651,742 | B2 | 5/2023 | Lee et al. | |
| 2009/0201231 | A1 | 8/2009 | Takahara et al. | |
| 2016/0125800 | A1* | 5/2016 | Kim | G09G 3/2003 345/212 |
| 2016/0217770 | A1* | 7/2016 | Kang | G06F 3/0304 |
| 2017/0004765 | A1* | 1/2017 | Tani | G09G 3/3275 |
| 2017/0365202 | A1* | 12/2017 | Lin | G09G 3/3258 |
| 2019/0051239 | A1* | 2/2019 | Park | G09G 3/3258 |
| 2020/0160789 | A1 | 5/2020 | Park | |

FOREIGN PATENT DOCUMENTS

| | | | |
|---|---|---|---|
| KR | 1020170003841 | A | 1/2017 |
| KR | 1020180013263 | A | 2/2018 |
| KR | 1020180021947 | A | 3/2018 |
| KR | 1020190016829 | A | 2/2019 |
| KR | 10-2119775 | B1 | 6/2020 |
| KR | 10-2022-0074394 | A | 6/2022 |
| KR | 10-2022-0086096 | A | 6/2022 |
| KR | 10-2022-0093862 | A | 7/2022 |
| KR | 10-2463843 | B1 | 11/2022 |
| KR | 10-2023-0000285 | A | 1/2023 |

* cited by examiner

DISPLAY APPARATUS AND CONTROLLING METHOD FOR THE SAME

CROSS-REFERENCE TO RELATED APPLICATION

This application is a continuation of U.S. application Ser. No. 17/859,677, filed on Jul. 7, 2022 (allowed), which is Continuation of International Application No. PCT/KR2022/009622, filed on Jul. 4, 2022, which is based on and claims priority to Korean Patent Application No. 10-2021-0131874, filed on Oct. 5, 2021 in the Korean Intellectual Property Office, the disclosure of which is incorporated by reference herein in its entirety.

BACKGROUND

1. Field

The disclosure relates to a display apparatus capable of reducing a booting time and a method for controlling the display apparatus.

2. Description of the Related Art

Generally, display apparatuses are classified into self-emissive display apparatuses with pixels each emitting light and non-emissive display apparatuses requiring separate light sources.

A Liquid Crystal Display (LCD), which is a representative non-emissive display apparatus, has a complicated structure and difficulties in implementing a thin size because the LCD requires a backlight unit for supplying light from behind the display panel, a liquid crystal layer functioning as a switch for transmitting/blocking light, a color filter for changing supplied light to desired colors, etc.

The self-emissive display apparatuses, in which each pixel itself emits light by including a light emitting device, have a simple structure and a high degree of design freedom because the self-emissive display apparatuses do not require components, such as a backlight unit, a liquid crystal layer, etc. Also, the self-emissive display apparatuses implement a thin thickness, as well as an excellent contrast ratio, high brightness, and a wide viewing angle.

The self-emissive display apparatuses include a micro Light Emitting Diode (LED) display or a mini LED display configured with inorganic light emitting devices, and an Organic Light Emitting Diode (OLED) display configured with organic light emitting devices.

However, the self-emissive display apparatuses are subject to brightness degradation of the pixels due to deterioration of the pixels, resulting in degradation of image quality.

To prevent such degradation of image quality, the self-emissive display apparatuses perform a sensing process for estimating a degree of deterioration of the pixels and compensating input data based on the estimated degree of deterioration upon booting. However, the sensing process delays a booting time of the display apparatuses, which causes a user's inconvenience.

SUMMARY

Provided are a display apparatus and a method for controlling the display apparatus that may overcome degradation of image quality and reduce a booting time of the display apparatus.

Additional aspects of the disclosure will be set forth in part in the description which follows and, in part, will be obvious from the description, or may be learned by practice of the disclosure.

According to an aspect of the disclosure, a display apparatus includes: a display panel including a plurality of pixels; a timing controller configured to drive the display panel; and at least one controller configured to control the timing controller to perform a sensing process for sensing electrical characteristics of the plurality of pixels based on power-on of the display panel, wherein the at least one controller is further configured to determine whether to perform the sensing process or skip the sensing process based on a power-off period of the display panel before the display panel is powered on.

The at least one controller may be further configured to control the timing controller to perform the sensing process based on the power-off period of the display panel being longer than a preset time period.

The at least one controller may be further configured to control the timing controller to skip the sensing process based on the power-off period of the display panel being shorter a the preset time period.

The display apparatus may further include a storage device configured to store compensation data obtained by performing the sensing process by the timing controller, and the timing controller may be further configured to drive the display panel based on compensation data that is last stored in the storage device, upon skipping of the sensing process.

The at least one controller may be further configured to control the timing controller to perform the sensing process while the display panel is powered off, and the timing controller may be further configured to drive the display panel based on compensation data obtained in the sensing process performed while the display panel is powered off, upon skipping of the sensing process when the display panel is powered on.

The at least one controller may be further configured to control the timing controller to skip the sensing process when the display panel is powered on according to a voice command including a wake-up word.

The at least one controller may be further configured to control the timing controller to perform the sensing process every preset time period in the power-off period of the display panel.

The at least one controller may be further configured to determine whether to perform the sensing process or skip the sensing process, based on a time period between a time at which the sensing process has been last performed and a time at which the display panel is powered on.

The timing controller may be further configured to drive, upon performing of the sensing process, the display panel to display an image based on completion of the sensing process.

The timing controller may be further configured to drive, upon skipping of the sensing process when the display panel is powered on, the display panel to display an image based on booting completion of the timing controller.

According to an aspect of the disclosure, a method for controlling a display apparatus includes: determining whether to perform or skip a sensing process for sensing electrical characteristics of a plurality of pixels included in a display panel based on a power-off period of the display panel before the display panel is powered on; based on determining to perform the sensing process, controlling a timing controller of the display apparatus to perform the sensing process based on power-on of the display panel; and based on determining to skip the sensing process, controlling the timing controller to skip the sensing process based on power-on of the display panel.

The controlling of the timing controller to perform the sensing process may include controlling the timing controller to perform the sensing process based on the power-off period of the display panel being longer than a preset time period.

The controlling of the timing controller to skip the sensing process may include controlling the timing controller to skip the sensing process based on the power-off period of the display panel being shorter than a preset time period.

The method may further include: storing, in a storage device of the display apparatus, compensation data obtained by performing the sensing process by the timing controller; and driving the display panel based on compensation data last stored in the storage device upon skipping of the sensing process when the display panel is powered on.

The method may further include: controlling the timing controller to perform the sensing process while the display panel is powered off; and driving the display panel based on compensation data obtained in the sensing process performed while the display panel is powered off upon skipping of the sensing process when the display panel is powered on.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a flowchart of a case in which a display apparatus according to an embodiment of the disclosure receives a user input for power-on;

DETAILED DESCRIPTION

Figure 1:
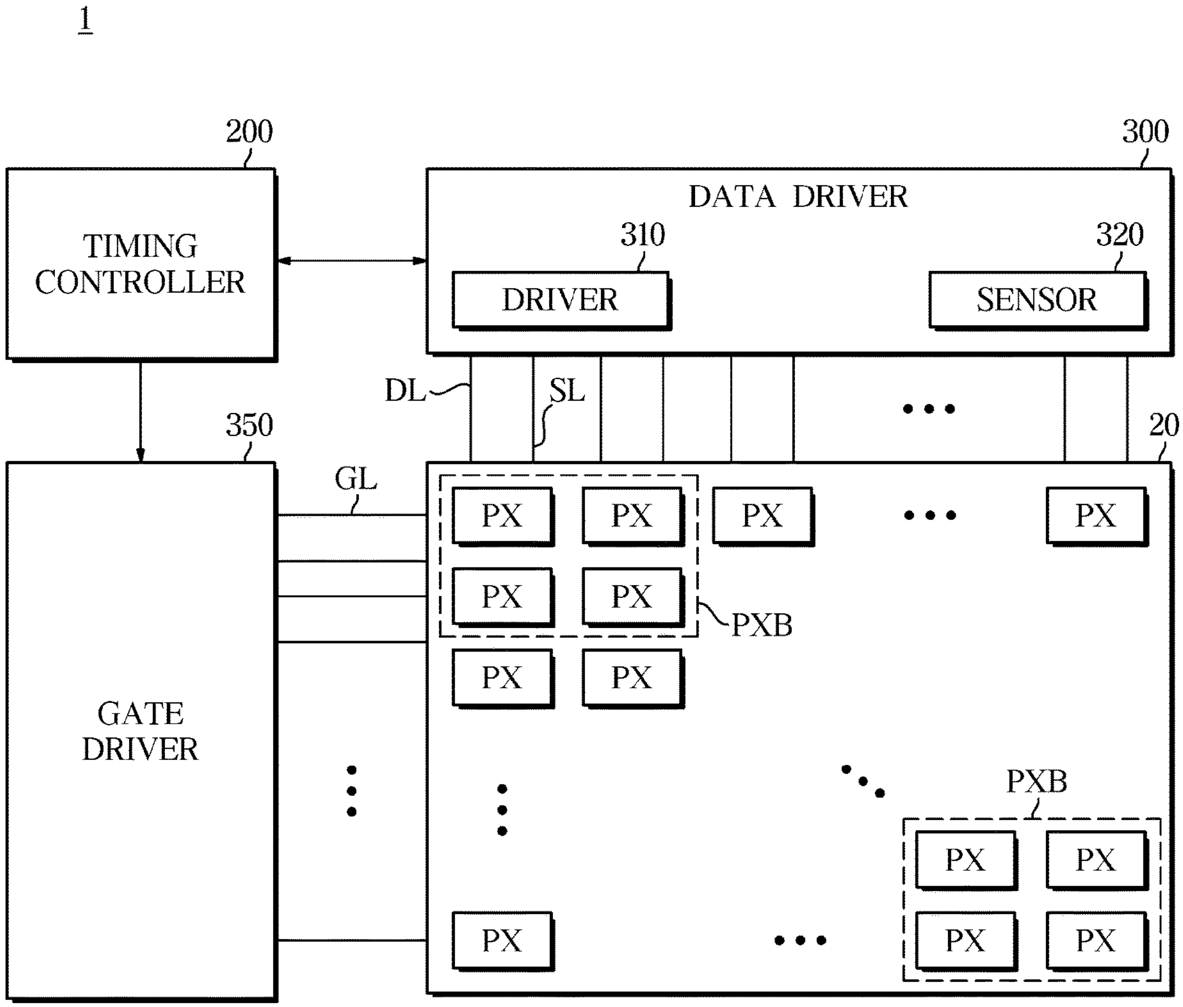
FIG. 1 is a block diagram showing a display apparatus according to an embodiment of the disclosure.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, the terms used in the present specification are merely used to describe embodiments, and are not intended to limit and/or restrict the disclosure.

An expression used in the singular encompasses the expression of the plural, unless it has a clearly different meaning in the context.

Also, it will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another.

In addition, the terms "portion", "device", "block", "member", and "module" used herein refer to a unit for processing at least one function or operation. For example, the terms may mean at least one process that may be processed by at least one hardware such as field-programmable gate array (FPGA) or application specific integrated circuit (ASIC), or at least one software or processor stored in a memory.

Hereinafter, an embodiment of the disclosure will be described in detail with reference to the accompanying drawings. Also, like reference numerals or symbols denoted in the accompanying drawings represent members or components that perform the substantially same functions.

Throughout the disclosure, the expression "at least one of a, b or c" indicates only a, only b, only c, both a and b, both a and c, both b and c, all of a, b, and c, or variations thereof.

Hereinafter, an operation principle and embodiments of the disclosure will be described with reference to the accompanying drawings.

FIG. 1 is a block diagram showing a display apparatus according to an embodiment of the disclosure.

A display apparatus 1 according to an embodiment of the disclosure may include a micro LED display or a mini LED display configured with an inorganic light emitting device, and an Organic Light Emitting Diode (OLED) display configured with an organic light emitting device. However, the display apparatus 1 may be any display apparatus including a self-emissive device.

Hereinafter, for convenience of description, the display apparatus 1 is assumed to be an OLED display.

Also, the display apparatus 1 according to an embodiment of the disclosure may be installed in all kinds of electronic apparatuses having an image display function. For example, the display apparatus 1 may be installed in a smart phone, a tablet personal computer (PC), a portable multimedia player (PMP), a camera, a wearable device, a television, a digital video disk (DVD) player, a refrigerator, an air conditioner, an air purifier, a set-top box, a robot, a drone, various kinds of medical equipment, a navigation system, a global positioning system (GPS) receiver, an Advanced Drivers Assistance System (ADAS), a device for vehicle, furniture, various kinds of measuring instruments, etc.

Referring to FIG. 1, the display apparatus 1 may include a display panel 20, a timing controller 200, a data driver 300, and a gate driver 350.

According to various embodiments of the disclosure, the display panel 20, the timing controller 200, the data driver 300, and the gate driver 350 may be implemented as one module. For example, the timing controller 200, the data driver 300, and the gate driver 350 may be mounted on a circuit film, such as a Tape Carrier Package (TCP), Chip On Film (COF), Flexible Print Circuit (FPC), etc., and attached to the display panel 20 by a Tape Automatic Bonding (TAB) method, or may be mounted on an non-display area of the display panel 20 by a Chip On Glass (COG) method.

The display panel 20 may include a plurality of signal lines, for example, a plurality of gate lines GL, a plurality of data lines DL, and a plurality of sensing lines SL, and include a plurality of pixels PX, for example, a pixel array connected to the plurality of signal lines and arranged in a matrix form.

Each of the plurality of pixels PX may display a color among red, green, and blue, and a pixel displaying red, a pixel displaying green, and a pixel displaying blue may be repeatedly arranged in sequential order. Also, a user may recognize light of one color to which red light, green light, and blue light displayed by neighboring pixels PX are mixed. According to various embodiments of the disclosure, a pixel displaying red, a pixel displaying green, and a pixel displaying blue are respectively referred to as a red sub pixel, a green sub pixel, and a blue sub pixel, and a group of a red sub pixel, a green sub pixel, and a blue sub pixel is referred to as a pixel. According to an embodiment of the disclosure, each of the plurality of pixels PX may display a color among red, green, blue, and white, although not limited thereto. A combination of colors that may be displayed by the pixels PX may be adopted freely within a technical range known in the art.

According to various embodiments of the disclosure, the display panel 20 may be an OLED display panel in which each pixel PX includes a light emitting device, for example, an OLED, although not limited thereto. However, the display panel 20 may be implemented as another kind of flat panel display or a flexible display panel.

The timing controller 200 may control overall operations of the display apparatus 1, and control driving timings of the data driver 300 and the gate driver 350 based on control commands received from an external processor, for example, a main processor of an electronic apparatus in which the display apparatus 1 is installed, or an image processor. The timing controller 200 may be implemented as hardware, software, or a combination of hardware and software. For example, the timing controller 200 may be implemented as digital logic circuits or registers for performing functions which will be described below.

The timing controller 200 may provide a data driver control signal to the data driver 300, and operations and operation timings of a driver 310 and a sensor 320 of the data driver 300 may be controlled in response to the data driver control signal.

The timing controller 200 may provide a gate driver control signal to the gate driver 350. The gate driver 350 may drive a plurality of gate lines GL of the display panel 20 in response to the gate driver control signal.

The timing controller 200 may perform various image processing, such as format conversion, a consumption power reduction, etc., on image data received from an external processor. The image data may include input data corresponding to each pixel PX, and the timing controller 200 may perform data compensation on image data of each pixel PX and provide the compensated data to the data driver 300, to compensate deterioration of the plurality of pixels PX of the display panel 20. For this, the timing controller 200 may include a storage device (not shown). The storage device of the timing controller 200 may be implemented as a memory.

The timing controller 200 may perform a sensing process for obtaining compensation data for compensating deterioration of the plurality of pixels PX, based on a control of a main controller 100, and store the compensation data obtained through the sensing process in the storage device.

According to various embodiments of the disclosure, the timing controller 200 may group the plurality of pixels PX into a plurality of pixel blocks PXB, calculate a deterioration value for each of the plurality of pixel blocks PXB, and perform data compensation on the pixel block PXB based on the calculated deterioration value and a deterioration model.

The gate driver 350 may drive the plurality of gate lines GL of the display panel 20 by using a gate driver control signal received from the timing controller 200. The gate driver 350 may provide pulses of a gate-on voltage, for example, a scan voltage or a sensing-on voltage to each of the plurality of gate lines GL during a driving period corresponding to the gate line GL, based on the gate driver control signal.

The data driver 300 may include the driver 310 and the sensor 320, drive the plurality of pixels PX through the plurality of data lines DL based on a data driver control signal received from the timing controller 200, and sense (measure) electrical characteristics of the plurality of pixels PX through the plurality of sensing lines SL.

The driver 310 may perform digital-analog conversion on image data received from the timing controller 200, for example, compensated input data for each of the plurality of pixels PX, and provide driving signals which are converted analog signals to the display panel 20 through the plurality of data lines DL. The driving signals may be respectively provided to the plurality of pixels PX.

The timing controller 200 may operate the data driver 300 in a display mode for displaying images or in a sensing mode for performing a sensing process.

In the display mode, the driver 310 may convert image data provided from the timing controller 200 into driving signals, for example, driving voltages, and output the driving voltages to the data lines DL of the display panel 20.

In the sensing mode, the driver 310 may convert sensing data provided from the timing controller 200 and set internally into driving signals, for example, driving voltages, and output the driving voltages to the data lines DL of the display panel 20.

According to an embodiment of the disclosure, the timing controller 200 may transmit a sensing control signal to the driver 310 to perform a sensing process, and accordingly, the sensor 320 may sense electrical characteristics of the individual pixels PX through the sensing lines SL and transfer measured sensing values to the timing controller 200. The sensing control signal may include a sensing period, locations of sensing pixel blocks, a sensing method, etc. The sensing method may include, for example, at least one of measuring threshold voltages of driving transistors included in pixels PX, measuring potential differences at both terminals of light emitting devices included in pixels PX, or measuring amounts or mobility of current flowing through light emitting devices.

The sensor 320 may measure electrical characteristics of the plurality of pixels PX periodically or non-periodically based on a control of the timing controller 200. The timing controller 200 may control the data driver 300 and the gate driver 350 to sense (measure) electrical characteristics of the plurality of pixels PX based on reception of a control signal for performing a sensing process from the main controller 100, and a period for which the timing controller 200 performs a sensing process may be set to a booting period after the display apparatus 1 is powered on, an ending period upon power-off, or a dummy period (a vertical blanking period) between frame display periods of the display panel 20.

The sensor 320 may receive sensing signals (for example, pixel voltages or pixel current) representing electrical characteristics of the plurality of pixels PX through the plurality of sensing lines SL, and perform analog-digital conversion on the sensing signals to generate sensing data.

The sensing data may include at least one(s) of, for example, threshold voltages of the driving transistors included in the pixels PX, potential differences at both terminals of the light emitting devices included in the pixels PX, or amounts or mobility of current flowing through the light emitting devices.

Hereinafter, for convenience of description, a sensing process that is performed for a booting period after the display apparatus 1 is powered on is defined as an ON-sensing process, and a sensing process that is performed for an ending period upon power-off of the display apparatus 1 is defined as an OFF-sensing process.

The timing controller 200 may generate compensation data for compensating deterioration values of the pixels PX based on the sensing data received from the sensor 320, and store the compensation data in the storage device.

That is, the sensing process may be a series of processes in which the timing controller 200 provides data for sensing to the data driver 300 and controls operation timings of the data driver 300 and the gate driver 350 for the sensor 320 to obtain sensing data to which electrical characteristics of the individual pixels PX are reflected, and the timing controller 200 obtains compensation data for compensating degrees of deterioration of the pixels PX based on the sensing data.

The driver 310 may include a plurality of channel drivers, and each of the plurality of channel drivers may convert received data, for example, input data obtained by compensating image data based on compensation data, into a driving signal. As such, the plurality of channel drivers may perform digital-analog conversion, and accordingly, the plurality of channel drivers may be referred to as a digital-analog converter.

According to various embodiments of the disclosure, the timing controller 200 may perform a sensing process on only some pixels (for example, pixels arranged on even-numbered columns or pixels and/or pixel blocks (PXB) to be arranged on odd-numbered columns) of the plurality of pixels PX.

Figure 2:
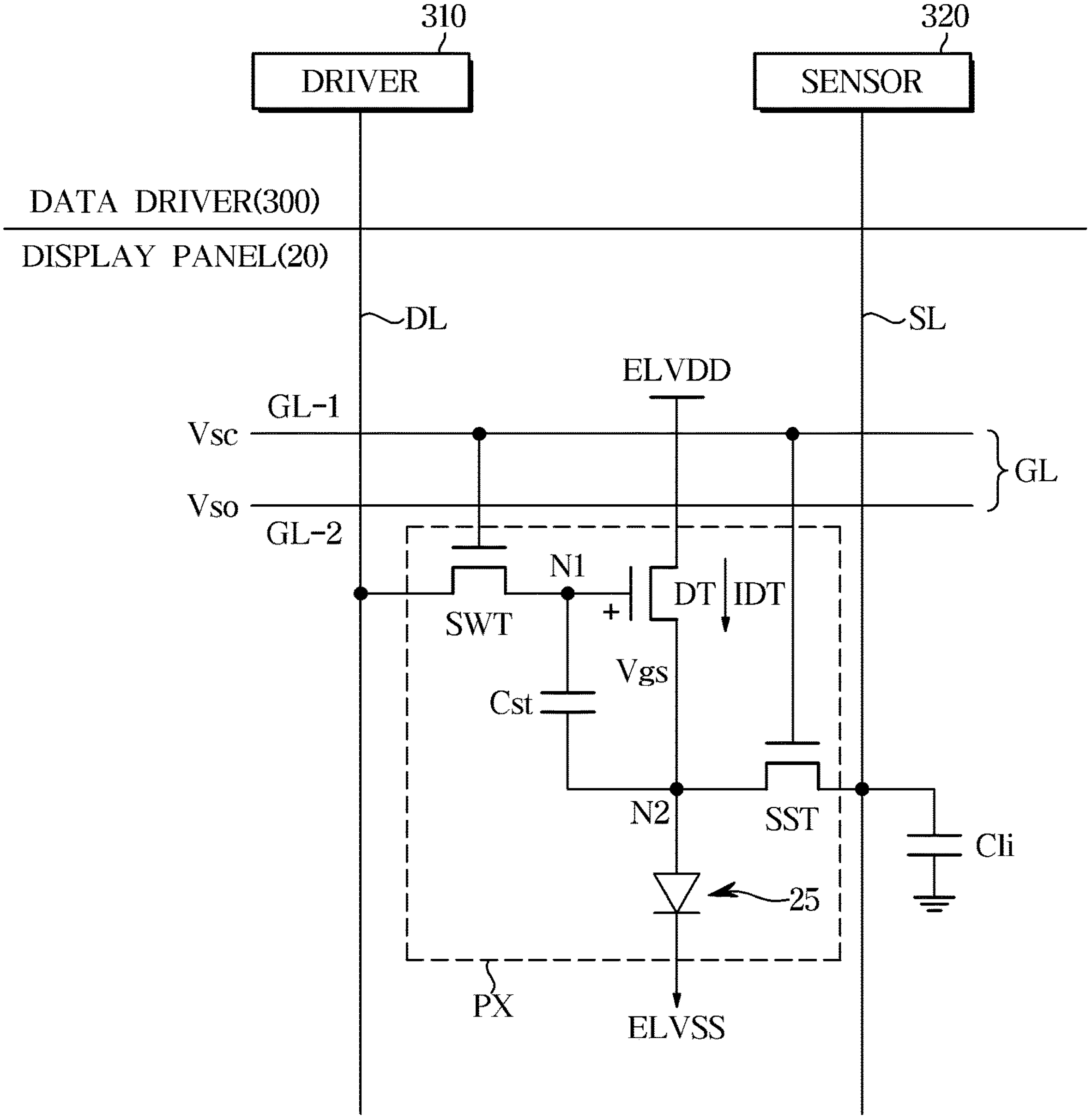
FIG. 2 shows a driving circuit of a pixel in a display apparatus according to an embodiment of the disclosure.

FIG. 2 shows a driving circuit of a pixel in a display apparatus according to an embodiment of the disclosure.

Referring to FIG. 2, a pixel PX may include a switching transistor SWT, a driving transistor DT, a light emitting device 25, a storage capacitor Cst, and a sensing transistor SST. However, a configuration and structure of the pixel PX of FIG. 2 are only an example of a pixel (PX) circuit, and the configuration and structure of the pixel PX may change variously. According to various embodiments of the disclosure, the light emitting device 25 may be an organic light emitting device and/or an inorganic light emitting device.

A first driving voltage ELVDD and a second driving voltage ELVSS may be applied to the pixel PX. The first driving voltage ELVDD may be relatively higher than the second driving voltage ELVSS.

The switching transistor SWT, the sensing transistor SST, and the driving transistor DT may be formed as amorphous silicon (a-Si) Thin Film Transistors (TFTs), poly-silicon (poly-Si) TFTs, oxide TFTs, or organic TFTs.

Gate lines GL connected to the pixel PX may include a first gate line GL-1 and a second gate line GL-2. The switching transistor SWT may be connected to the first gate line GL-1 and a data line DL, and turned on in response to a scan voltage Vsc applied through the first gate line GL-1 to provide a driving signal (for example, a driving voltage) supplied through the data line DL to a gate node N1 of the driving transistor DT. The driving signal may be generated by the digital-analog converter (for example, the channel drivers) of the data driver 300.

The sensing transistor SST may be connected to the second gate line GL-2 and a sensing line SL and turned on by a sensing-ON voltage Vso applied through the second gate line GL-2. At this time, a sensing switch of the data driver 300 may be turned on in response to an initial signal, and provide an initialization voltage (or a reset voltage) to the pixel PX through the sensing line SL. The sensing transistor SST may provide the initialization voltage provided from the data driver 300 to a source node N2 of the driving transistor DT. The sensing transistor SST may also be turned on in the sensing mode, and output current from the driving transistor or the light emitting device 25 to the sensing line SL.

The storage capacitor Cst may store a difference between a data voltage Vd applied to the gate node N1 of the driving transistor DT through the switching transistor SWT and the initialization voltage supplied to the source node N2 of the driving transistor DT through the sensing transistor SST to thereby supply a certain driving voltage Vgs to the driving transistor DT for a preset time period, for example, one frame.

The first driving voltage ELVDD may be applied to a drain node of the driving transistor DT, and the driving transistor DT may supply driving current IDT being proportional to the driving voltage Vgs to the light emitting device 25.

The light emitting device 25 may include an anode connected to the source node N2 of the driving transistor DT, a cathode to which the second driving voltage ELVSS is applied, and a light emitting layer between the cathode and the anode. The cathode may be a common electrode shared by all of the pixels PX. According to driving current IDT supplied from the driving transistor DT, the light emitting device 25 may emit light at the light emitting layer. Intensity of the light may be proportional to the driving current IDT.

The driving current IDT may be expressed by Equation 1 below.

$$I_{DT}=\beta(Vgs-Vth)2=\beta(Vd-Vint-Vth)2, \quad \text{[Equation 1]}$$

where β represents a constant value determined by mobility of the driving transistor DT, Vth represents a threshold voltage of the driving transistor DT, and Vint represents a reset voltage provided through the sensing line SL.

In the sensing mode, electrical characteristics of the pixel PX may be measured. The switching transistor SWT may supply a data voltage for sensing, which is applied through the data line DL, to the driving transistor DT. The sensing transistor SST may be turned on, and thus, current IDT being proportional to a difference (that is, a driving voltage Vgs) between a voltage of the gate node N1 of the driving transistor DT and a voltage of the source node N2 may flow to the sensing line SL to charge a parasitic capacitor (that is, a line capacitor Cli) of the sensing line SL.

A sensing signal received through the sensing line SI at a time at which a voltage of the source node N2 of the driving transistor DT arrives at a saturation state or at a time at which a voltage of the source node N2 increases linearly, according to various sensing sequences, may be converted into sensing data by the analog-digital converter ADC. A sensing signal measured at a time at which a voltage of the source node N2 arrives at a saturation state may include information about a threshold voltage Vth of the driving transistor DT, and a sensing signal measured at a time at which a voltage of the source node N2 increases linearly may include information about current mobility of the driving transistor DT, although not limited thereto. However, electrical characteristics may be sensed according to various sensing methods or sequences.

Figure 3:
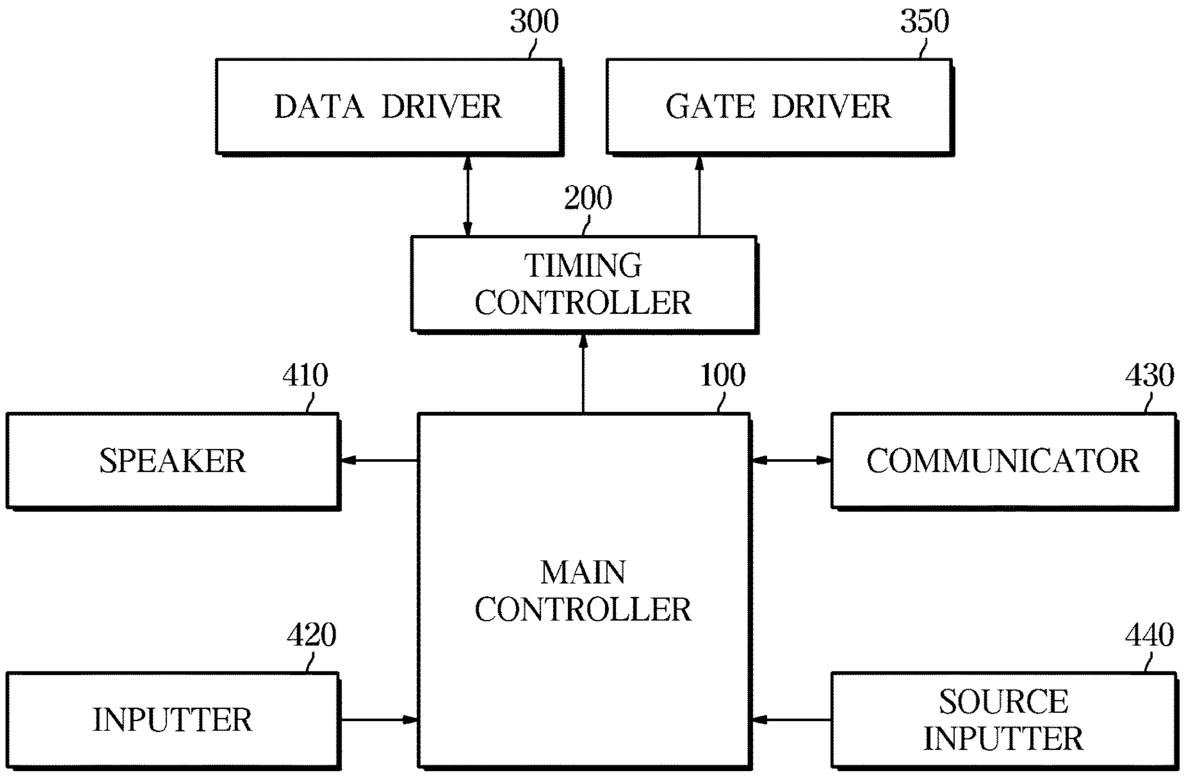
FIG. 3 is a block diagram showing a configuration of a display apparatus according to an embodiment of the disclosure.

FIG. 3 is a block diagram showing a configuration of a display apparatus according to an embodiment of the disclosure.

Referring to FIG. 3, the display apparatus 1 according to an embodiment of the disclosure may include the timing controller 200, the data driver 300, and the gate driver 350 as described above, and may include the main controller 100 for controlling the timing controller 200, a communicator 430 for communicating with an external device, a source inputter 440 for receiving a source image, a speaker 410 for outputting sound, and an inputter 420 for receiving a command for controlling the display apparatus 1 from a user.

The inputter 420 may include a button or a touch pad provided in an area of the display apparatus 1, and in the case of the display panel 20 implemented as a touch screen, the inputter 420 may include a touch pad provided in front of the display panel 20. Also, the inputter 420 may include a remote controller for receiving a user input remotely and/or a microphone for receiving a voice command.

The inputter 420 may receive various commands for controlling the display apparatus 1, such as power-on/off of the display apparatus 1, volume control, channel adjustment, screen adjustment, various setting changes, etc., from a user.

The power-on/off of the display apparatus 1 may mean power-on/off of the display panel 20. That is, even when the display apparatus 1 is powered off, power can be supplied to the main controller 100.

The speaker 410 may output sound synchronized with an image output from the display panel 20 under a control of the main controller 100.

The communicator 430 may communicate with a relay server or another electronic apparatus to transmit/receive desired data to/from the relay server or the other electronic apparatus. The communicator 430 may adopt at least one of various wireless communication methods, such as 3rd Generation (3G), 4th Generation (4G), Wireless Local Area Network (WLAN), Wireless-Fidelity (Wi-Fi), Bluetooth, Zigbee, Wi-Fi Direct (WFD), Ultra wideband (UWB), Infrared Data Association (IrDA), Bluetooth Low Energy (BLE), Near Field Communication (NFC), Z-Wave, etc. Also, the communicator 430 may adopt a wired communication method, such as Peripheral Component Interconnect (PCI), PCI-express, Universal Serial Bus (USB), etc.

The source inputter 440 may receive a source signal from a game console, a set-top box, a USB, an antenna, etc. Accordingly, the source inputter 440 may include at least one selected from among a group of source input interfaces including a HDMI cable port, a USB port, an antenna, etc.

The source signal received by the source inputter 440 may be processed by the main controller 100 and converted into a format that is output by the display panel 20 and the speaker 410.

The main controller 100 and the timing controller 200 may include at least one memory storing programs and various data for performing the above-described operations and operations which will be described below, and at least one processor for executing the stored programs.

The memory constituting the main controller 100 and the timing controller 200 may include a volatile memory, such as Static Random Access Memory (S-RAM) and Dynamic Random Access Memory (D-RAM), and a non-volatile memory, such as Read Only Memory (ROM) and Erasable Programmable Read Only Memory (EPROM). The memory may include a single memory device or a plurality of memory devices.

The at least one processor constituting the main controller 100 and the timing controller 200 may execute a program stored in each memory.

The term "main controller 100" is used to distinguish it from "a timing controller 200", and is not limited to a typical main-controller of a display apparatus. The main controller 100 may include at least one controller powered on while the display apparatus 1 is powered off. For example, the main controller 100 may include at least one of a typical main-controller of a display apparatus or a typical sub-controller of a display apparatus.

According to various embodiments of the disclosure, the main controller 100 may process a source signal received through the source inputter 440 and/or a source signal received wirelessly through the communicator 430 to generate an image signal corresponding to the received source signal.

For example, the main controller 100 may include a source decoder, a scaler, an image enhancer, and a graphic processor. The source decoder may decode a source signal compressed into a format such as MPEG, and the scaler may output image data of desired resolution through resolution conversion.

The image enhancer may apply various correction techniques to enhance image quality of the image data. The graphic processor may divide pixels of the image data into RGB data, and output the RGB data together with a control signal such as a syncing signal, etc. for a display timing of the display panel 20. That is, the main controller 100 may output a control signal and image data corresponding to a source signal.

Also, the main controller 100 may change a frame rate of the image data to correspond to a frame rate of the source signal. Therefore, the display apparatus 1 may output the source signal without damaging the source signal by changing a frame rate according to the source signal.

According to various embodiments of the disclosure, the main controller 100 may control the timing controller 200 to perform or skip a sensing process.

For example, the main controller 100 may transfer a control signal for performing a sensing process and/or a control signal for skipping a sensing process to the timing controller 200 through a general-purpose input/output (GPIO).

As another example, the main controller 100 may transfer a control signal for performing a sensing process and/or a control signal for skipping a sensing process to the timing controller 200 through an Inter-Integrated Circuit (I2C).

However, a communication method of the main controller 100 and the timing controller 200 is not limited to the above-described method, and various communication methods (for example, wired communication) for transferring a control signal may be adopted.

The above-described operations of the main controller 100 may be only an example that is applicable to the display apparatus 1, and another operation may be further performed or some of the above-described operations may be omitted.

The data driver 300 and the gate driver 350 may be driven based on a timing control signal from the timing controller 200, and accordingly, the display panel 20 may be driven.

The display apparatus 1 according to an embodiment of the disclosure may include a power board, a main board, and a driving board. The power board may include a power module for supplying power to the main board and the driving board, and supply power according to various power supply methods based on a power on/off state or an off period of the display apparatus 1.

For example, the power board may supply power to the main board and the driving board for a first period although the display apparatus 1 is powered off, and for a second period after the first period elapses, the power board may supply power only to the main board.

According to various embodiments of the disclosure, the power board may supply power periodically to the main board and/or the driving board although the display apparatus 1 is powered off.

According to various embodiments of the disclosure, the main controller 100 and the timing controller 200 may be provided on separate boards or the same board. For example, the main controller 100 may be provided on the main board, and the timing controller 200 may be provided on the driving board, although not limited thereto.

Figure 4:
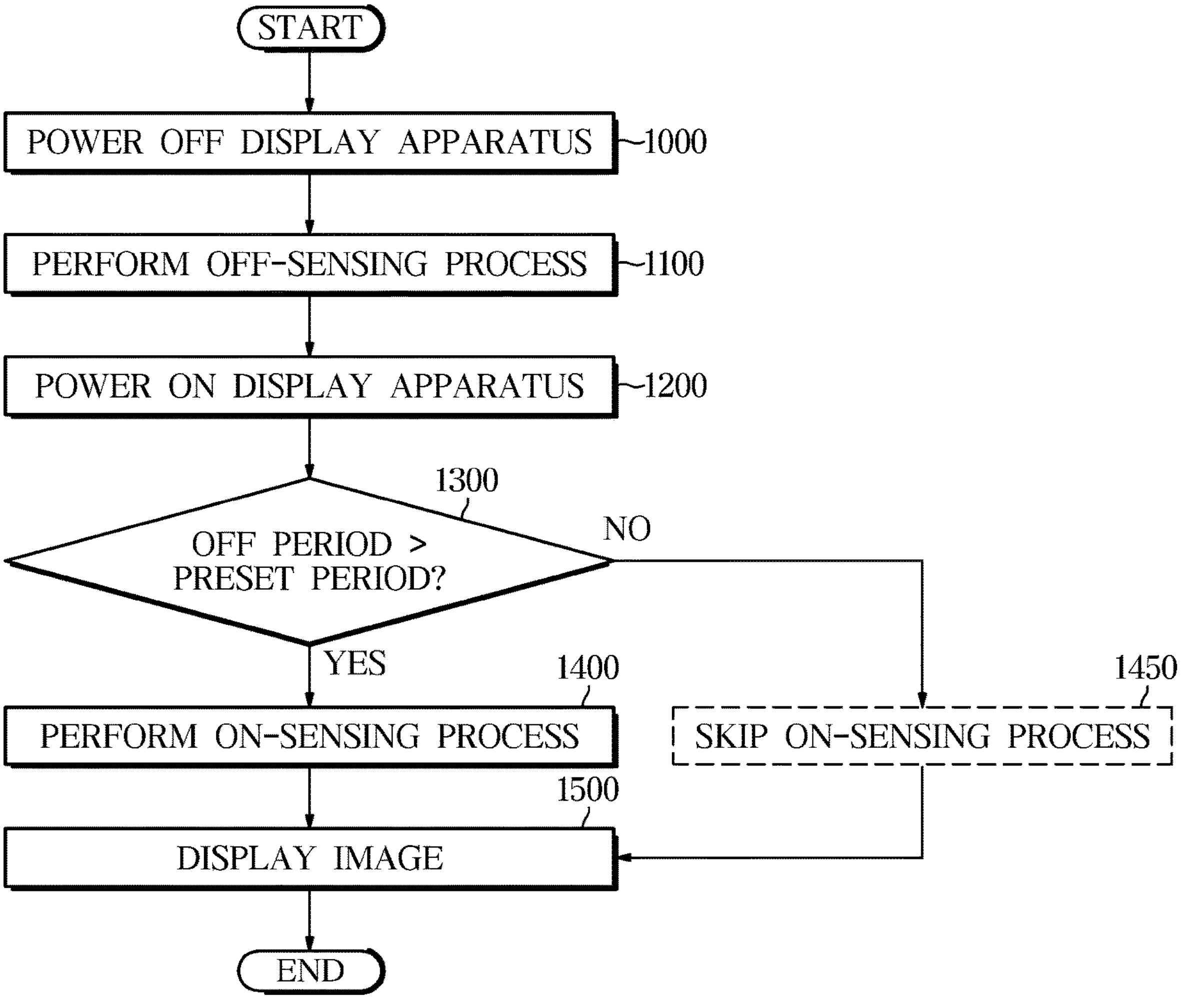
Figure 5:
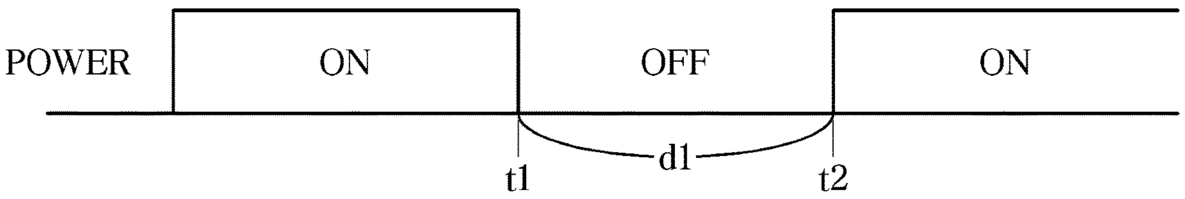
FIG. 5 is a view for describing a power-off period of a display apparatus according to an embodiment of the disclosure.
Figure 6:
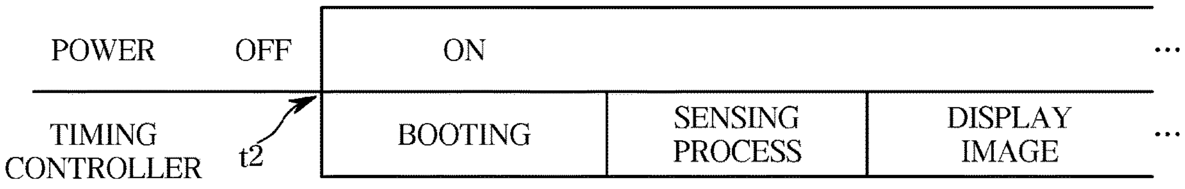
FIG. 6 is a view for describing an operation of performing an ON-sensing process in a display apparatus according to an embodiment of the disclosure.
Figure 7:
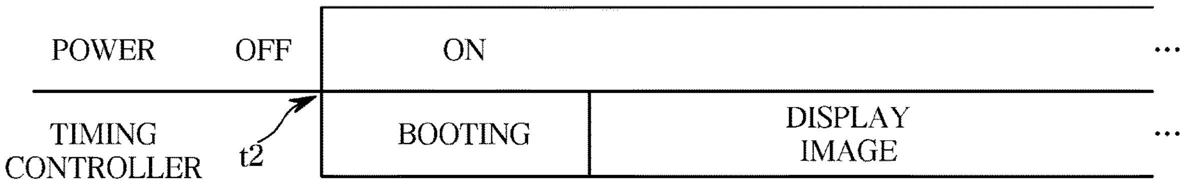
FIG. 7 is a view for describing an operation of skipping an ON-sensing process in a display apparatus according to an embodiment of the disclosure.

FIG. 4 is a flowchart of a case in which a display apparatus according to an embodiment of the disclosure receives a user input for power-on, FIG. 5 is a view for describing a power-off period of a display apparatus according to an embodiment of the disclosure, FIG. 6 is a view for describing an operation of performing an ON-sensing process in a display apparatus according to an embodiment of the disclosure, and FIG. 7 is a view for describing an operation of skipping an ON-sensing process in a display apparatus according to an embodiment of the disclosure.

Referring to FIG. 4, the display apparatus 1 may be powered off from a power-on state (operation 1000). Then, the timing controller 200 may perform an OFF-sensing process (operation 1100).

According to an embodiment of the disclosure, upon reception of a user input of powering off the display apparatus 1 through the inputter 420, the main controller 100 may control the timing controller 200 to perform an OFF-sensing process.

According to reception of a control signal for performing an OFF-sensing process, the timing controller 200 may drive the display panel 20 to obtain sensing data, as described above.

A user input of powering on/off the display apparatus 1 may be received from a remote controller, in a form of a voice command through a microphone, or through a power button provided in the display apparatus 1, although embodiments are not limited thereto.

Referring to FIG. 5, according to the reception of the user input of powering off the display apparatus 1 in a powered-on state of the display apparatus 1, the main controller 100 may store information about a time t1 at which the display apparatus 1 is powered off. The time t1 at which the display apparatus 1 is powered off may correspond to a time at which the user input of powering off the display apparatus 1 is received.

As described above, for a first time period after the time t1 at which the display apparatus 1 is powered off, power may be supplied to the timing controller 200, and the timing controller 200 may perform an OFF-sensing process within the first time period.

The timing controller 200 may generate compensation data for compensating deterioration values of the plurality of pixels PX based on sensing data obtained by performing the OFF-sensing process, and store the compensation data in the storage device (memory).

According to an embodiment of the disclosure, upon reception of a user input of powering on the display apparatus 1 while the display apparatus 1 is in a powered-off state (operation 1200), the main controller 100 may determine whether to perform a sensing process based on a time period d1 for which the display apparatus 1 has been powered off before the display apparatus 1 is powered on. A time t2 at which the display apparatus 1 is powered on may correspond to a time at which a user input of powering on the display apparatus 1 is received.

The main controller 100 may store the time t2 at which the display apparatus 1 is powered on.

The main controller 100 may determine the time period d1 for which the display apparatus 1 has been powered off before the display apparatus 1 is powered on, based on a difference between the time t1 at which the display apparatus 1 has been powered off and the time t2 at which the display apparatus 1 is powered on.

Referring to FIG. 6, the main controller 100 may control the timing controller 200 to perform an ON-sensing process according to a determination (YES in operation 1300) that the time period d1 for which the display apparatus 1 has been powered off before the display apparatus 1 is powered on is longer than a preset time period (operation 1400).

The preset time period may be stored in the memory of the main controller 100 and/or the memory of the timing controller 200, and the preset time period may be set by considering a time period for which electrical characteristics of each pixel do not change. For example, the preset time period may be set differently according to characteristics of the display apparatus 1, and may be set to about 1 hour.

The timing controller 200 may perform an ON-sensing process based on a control signal of the main controller 100 after the timing controller 200 is booted by receiving power from the power board, and drive the display panel 20 to display an image based on completion of the ON-sensing process (operation 1500).

According to an embodiment of the disclosure, the timing controller 200 may compensate image data transferred from the main controller 100 based on compensation data obtained by performing an ON-sensing process, and drive the display panel 20 based on the compensated image data.

A sensing process may consume a time of about 2 seconds to 5 seconds. Accordingly, in a case in which the timing controller 200 performs a sensing process after booting, it may take a long time to display an image. A user may feel uncomfortable about slowly displaying an image in the display apparatus 1.

To rapidly display an image by reducing a booting time of the display apparatus 1, the main controller 100 according to an embodiment of the disclosure may control the timing controller 200 to skip a sensing process based on a determination that a preset condition is satisfied.

Referring to FIG. 7, the main controller 100 may control the timing controller 200 to skip a sensing process according to a determination (NO in operation 1300) that the time period d1 for which the display apparatus 1 has been powered off is shorter than the preset time period (operation 1450).

The timing controller 200 may skip an ON-sensing process based on a control signal of the main controller 100 after the timing controller 200 is booted by receiving power from the power board, and drive the display panel 20 to display an image (operation 1500). That is, upon skipping of an ON-sensing process, the timing controller 200 may drive the display panel 20 to display an image based on booting.

According to an embodiment of the disclosure, upon skipping of a sensing process, the timing controller 200 may compensate image data transferred from the main controller 100 based on compensation data last stored in the storage device (for example, memory) of the timing controller 200, and drive the display panel 20 based on the compensated image data.

According to various embodiments of the disclosure, the compensation data last stored in the storage device (for example, memory) of the timing controller 200 may be compensation data obtained in an OFF-sensing process performed at the time t1 at which the display apparatus 1 has been last powered off.

A reason of skipping a sensing process may be to reduce a booting time of the display apparatus 1 by skipping an ON-sensing process and compensating image data with compensation data obtained in an OFF-sensing process, because a case that the time period d1 for which the display apparatus 1 has been powered off is shorter than the preset time period results in an estimate that electrical characteristics of the pixels have not greatly changed.

According to the disclosure, the display apparatus 1 may be powered on within an estimated time period for which electrical characteristics of the pixels will not greatly change, and in this case, a sensing process of the timing controller 200 may be skipped to rapidly display an image after the time t2 at which the display apparatus 1 is powered on.

According to the disclosure, a time period consumed from a time t1 at which a user input of powering on the display apparatus 1 is received to a time at which an image is displayed may be reduced, resulting in an improvement of a user's satisfaction.

According to the disclosure, because the data driver 300 operates in the display mode immediately after the timing controller 200 is booted, the display apparatus 1 may display an image rapidly.

Figure 8:
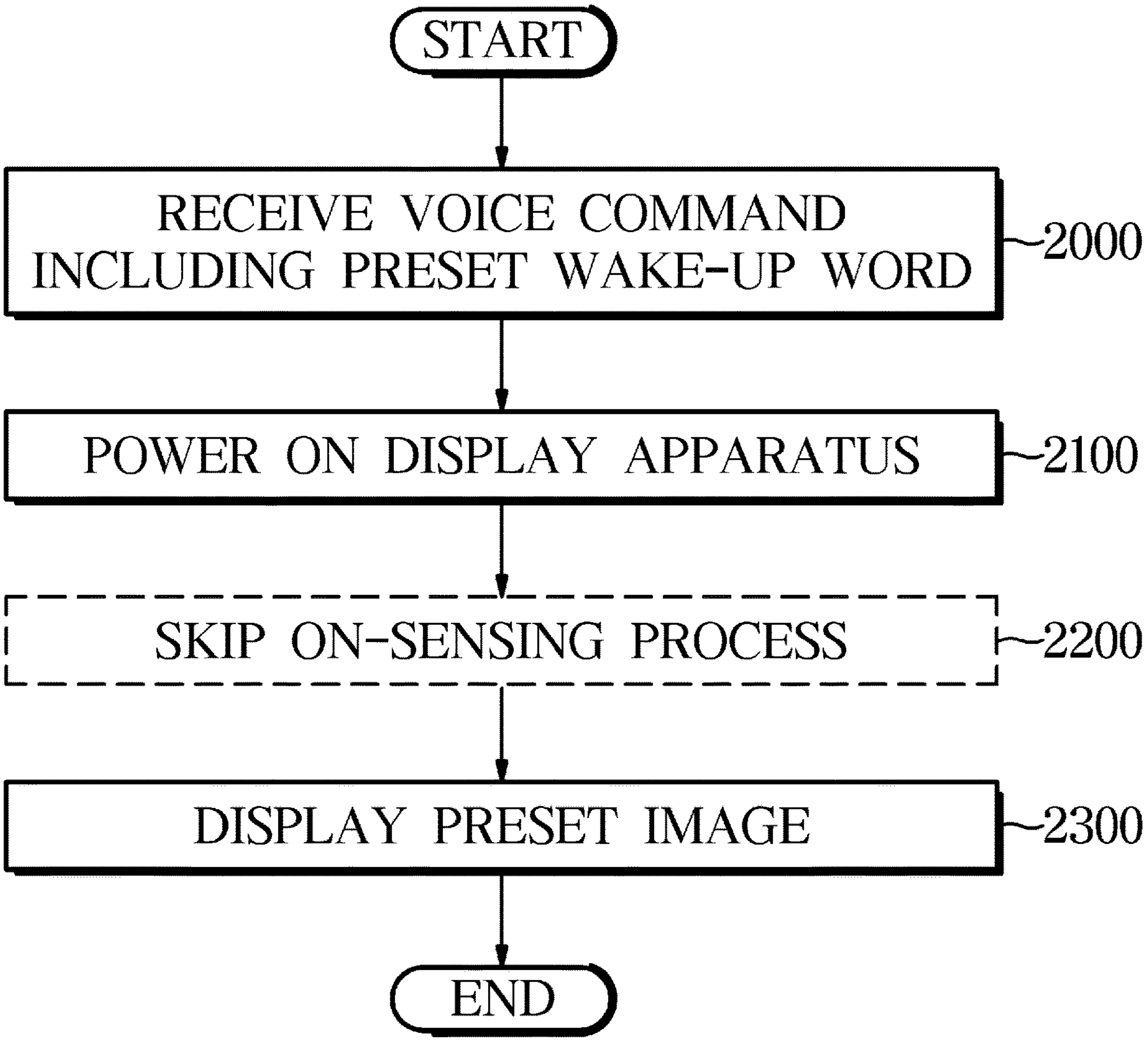
FIG. 8 is a flowchart of a case of receiving a voice command by a display apparatus according to an embodiment of the disclosure.

FIG. 8 is a flowchart of a case of receiving a voice command by a display apparatus according to an embodiment of the disclosure.

Referring to FIG. 8, the inputter 420 may receive a voice command including a preset wake-up word (operation 2000). For example, a microphone being in an active state may receive a preset voice signal, and the main controller 100 may power on the display apparatus 1 based on reception of the preset voice signal by the microphone (operation 2100).

The preset wake-up word may be to activate a voice recognition system of the display apparatus 1. The preset wake-up word may be set upon designing of the display apparatus 1 or change by a user's setting. For example, the preset wake-up word may be a word such as "Hi Bixby".

The case in which the display apparatus 1 is powered on based on reception of the voice command including the preset wake-up word may be interpreted as a user's intention for using the voice recognition system, rather than the user's intention for viewing an image through the display apparatus 1.

Accordingly, upon power-on of the display apparatus 1 according to the voice command including the preset wake-up word, the main controller 100 may control the timing controller 200 to skip a sensing process (operation 2200).

According to various embodiments of the disclosure, upon power-on of the display apparatus 1 according to the voice command including the preset wake-up word, the main controller 100 may transfer image data corresponding to displaying a preset image, not image data received through the source inputter 440, to the timing controller 200.

The timing controller 200 may drive the display panel 20 based on the image data corresponding to displaying the preset image to display the preset image (operation 2300).

The preset image may be an image for controlling a voice recognition function. For example, the preset image may be an image including a visual indicator for notifying the user that a voice recognition function has been activated.

The user may use the voice recognition function by uttering a voice command based on the preset image displayed on the display apparatus 1.

According to various embodiments of the disclosure, the main controller 100 may control the speaker to output preset sound based on reception of the voice command including the preset wake-up word. The preset sound may be sound for notifying that the voice recognition function has been activated.

According to various embodiments of the disclosure, the user may utter a voice command (for example, "turn on the TV") for powering on the display apparatus 1 after activating the voice recognition system of the display apparatus 1 through the voice command including the preset wake-up word, and in this case, the main controller 100 may determine whether to perform a sensing process based on the time period d1 for which the display apparatus 1 has been powered off.

According to the disclosure, there may be a case in which the user intends to use a specific function of the display apparatus 1 rather than viewing an image, and in this case, by rapidly outputting a screen related to the specific function by skipping a sensing process, the user's satisfaction may be improved.

Figure 9:
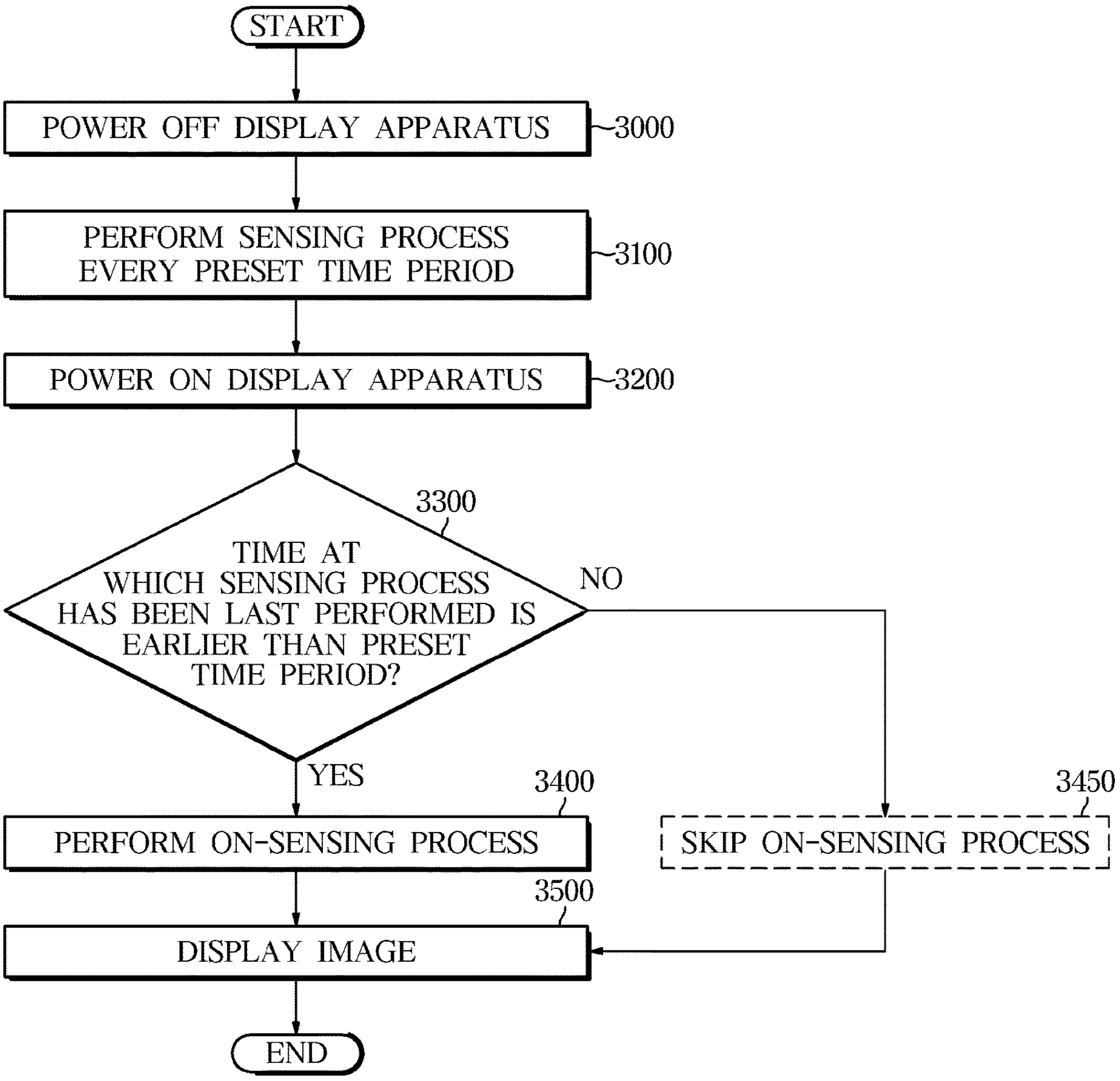
FIG. 9 is a flowchart of a case of performing a sensing process every preset time period in a display apparatus according to an embodiment of the disclosure.
Figure 10:
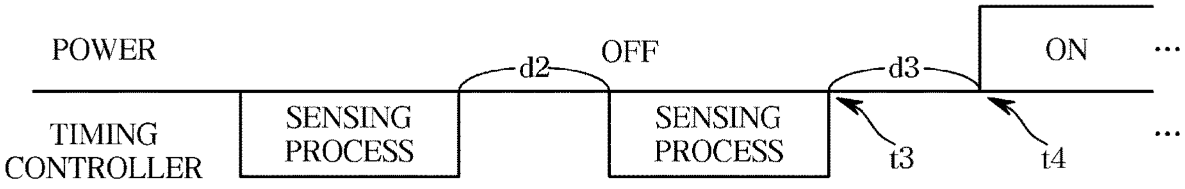
FIG. 10 is a view for describing a process of performing a sensing process every preset time period in a display apparatus according to an embodiment of the disclosure.

FIG. 9 is a flowchart of a case of performing a sensing process every preset time period in a display apparatus according to an embodiment of the disclosure, and FIG. 10 is a view for describing a process of performing a sensing process every preset time period in a display apparatus according to an embodiment of the disclosure.

Referring to FIGS. 9 and 10, the main controller 100 may control the timing controller 200 to perform a sensing process every preset time period d2 for a time period 3000 for which the display apparatus 1 is powered off (operation 3100).

For example, the main controller 100 may control the power board to turn on the driving board periodically, thereby causing the timing controller 200 to perform a sensing process.

The preset time period d2 may be set by considering a negative factor of power consumption required for performing a sensing process and a positive factor of a reduction of a booting time.

For example, the preset time period d2 may be set to about two hours, although not limited thereto. However, the preset time period d2 may change based on information about an on/off time of the display apparatus 1.

According to various embodiments of the disclosure, the main controller 100 may control the timing controller 200 to perform a sensing process at a preset time. For example, a user may power on the display apparatus 1 at 9:00 AM on average, and in this case, the main controller 100 may control the timing controller 200 to perform a sensing process before 9:00 AM.

According to reception of a user's input of powering on the display apparatus 1 in a power-off state of the display apparatus 1 (operation 3200), the main controller 100 may determine whether to perform an ON-sensing process based a time period d3 between a time t3 at which the sensing process has been last performed and a time t4 at which the display apparatus 1 is powered on.

As described above with reference to FIGS. 6 and 7, according to a determination (YES in operation 3300) that the time period d3 between the time t3 at which the sensing process has been last performed and the time t4 at which the display apparatus 1 is powered on is longer than a preset time period, the main controller 100 may control the timing controller 200 to perform an ON-sensing process (operation 3400).

The timing controller 200 may perform an ON-sensing process after booting, and drive the display panel 20 to display an image (operation 3500). At this time, the timing controller 200 may compensate image data received from the main controller 100 based on compensation data obtained by performing the ON-sensing process (operation 3400).

According to a determination (NO in operation 3300) that the time period d3 between the time t3 at which the sensing process has been last performed and the time t4 at which the display apparatus 1 is powered on is shorter than the preset time period, the main controller 100 may control the timing controller 200 to skip an ON-sensing process (operation 3450).

The timing controller 200 may drive the display panel 20 to display an image immediately after booting by skipping an ON-sensing process (operation 3500). At this time, the timing controller 200 may compensate image data received from the main controller 100 based on compensation data obtained in a sensing process (sensing process terminated at the time t3) last performed.

According to the disclosure, by performing a sensing process at an appropriate time even in a power-off period of the display apparatus 1, latest compensation data may be obtained, and accordingly, a situation in which an On-sensing process is skipped may be created.

Figure 11:
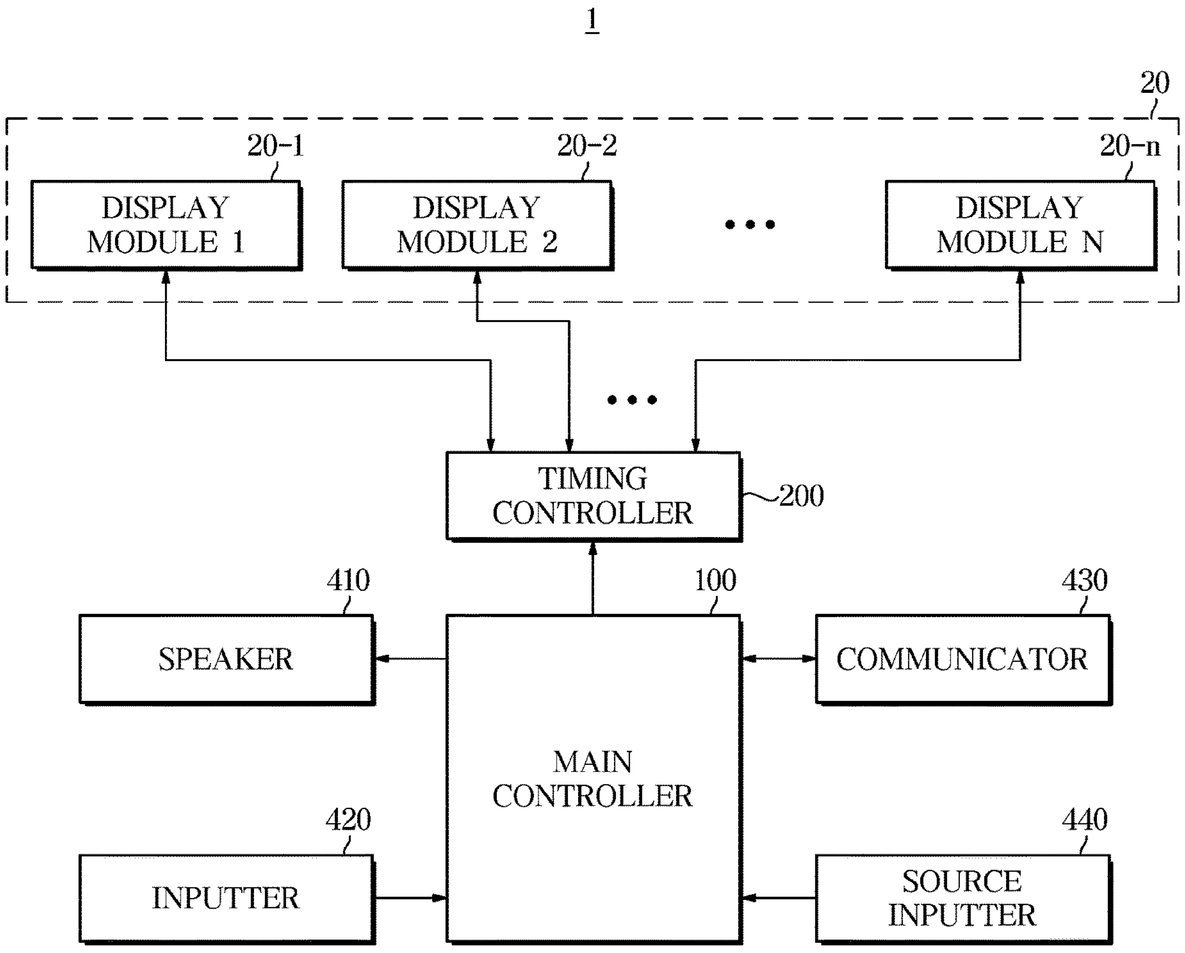
FIG. 11 is a block diagram showing a configuration of a display apparatus according to another embodiment of the disclosure.

FIG. 11 is a block diagram showing a configuration of a display apparatus according to another embodiment of the disclosure.

Referring to FIG. 11, the display apparatus 1 according to another embodiment of the disclosure may be a micro LED display or a mini LED display.

The display apparatus 1 according to another embodiment of the disclosure may include the display panel 20 configured with a plurality of display modules 20-1, 20-2, . . . , 20-*n* (n is an integer that is greater than or equal to 2), the main controller 100, the timing controller 200, the speaker 410, the inputter 430, the communicator 430, and the source inputter 440, which are components described above.

Each of the plurality of display modules 20-1, 20-2, . . . , 20-*n* may include at least one inorganic light emitting device, and a separate data driver for driving the at least one inorganic light emitting device.

Also, each of the plurality of display modules 20-1, 20-2, . . . , 20-*n* may include a separate micro pixel controller capable of switching the inorganic light emitting device based on a timing control signal output from the timing controller 200.

The display apparatus 1 according to another embodiment of the disclosure may also perform the above-described operations.

For example, the main controller 100 may control the timing controller 200 to perform a sensing process for sensing electrical characteristics of at least one pixel included in the plurality of display modules 20-1, 20-2, . . . , 20-*n* based on power-on of the display apparatus 1.

Also, the main controller 100 may determine whether to perform a sensing process based on a power-off period of the display apparatus 1 before the display apparatus 1 is powered on.

According to the disclosure, the display apparatus including a self-emissive device may perform a sensing process for preventing a deterioration phenomenon of the self-emissive device, thereby preventing a booting time from being delayed, while efficiently preventing the deterioration phenomenon.

According to an aspect of the disclosure, by reducing a booting time of the display apparatus, a user's convenience may be improved.

According to an aspect of the disclosure, in a case in which a user powers on the display apparatus after powering off the display apparatus by mistake, a previously displayed image may be rapidly displayed.

According to an aspect of the disclosure, in a case in which a user wakes up the display apparatus through a wake-up word, a screen related to a voice recognition function may be rapidly displayed.

Meanwhile, the disclosed embodiments may be implemented in the form of a recording medium that stores instructions executable by a computer. The instructions may be stored in the form of a program code, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may include Read Only Memory (ROM), Random Access Memory (RAM), a magnetic tape, a magnetic disc, flash memory, an optical data storage device, etc.

The machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment of the disclosure, a method according to various embodiments disclosed in this specification may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. A display apparatus comprising:

a display panel comprising a plurality of pixels; and at least one controller configured to receive a turn on request from user via a first input device and a second input device, the controller further configured to:

perform a sensing process for sensing electrical characteristics of the plurality of pixels based on a user input for turning on the display apparatus being received via the first input device, and skip the sensing process based on the user input for turning on the display apparatus being received via the second input device.

2. The display apparatus of claim 1, wherein based on the user input for turning on the display apparatus being received via the first input device, the at least one controller is further configured to determine whether to perform or skip the sensing process based on a length of a power-off period of the display apparatus.

3. The display apparatus of claim 2, wherein the at least one controller is configured to determine to perform the sensing process based on the power-off period of the display panel being longer than a preset time period.

4. The display apparatus of claim 2, wherein the at least one controller is configured to determine to skip the sensing process based on the power-off period of the display apparatus being shorter than a preset time period.

5. The display apparatus of claim 1, further comprising a storage device configured to store compensation data obtained by performing the sensing process, wherein the at least one controller is further configured to drive the display panel based on compensation data that is last stored in the storage device, when skipping the sensing process when the user input for turning on the display is received via the second input device.

6. The display apparatus of claim 1, wherein the at least one controller is further configured to perform the sensing process while the display apparatus is being powered off.

7. The display apparatus of claim 6, wherein the at least one controller is further configured to perform the sensing process every preset time period in a power-off period of the display apparatus.

8. The display apparatus of claim 7, wherein the at least one controller is further configured to determine whether to perform or skip the sensing process, based on a time period between a time at which the sensing process has been last performed and a time at which the user input for turning on the display apparatus is received via the first input device.

9. The display apparatus of claim 1, wherein the at least one controller is further configured to drive, upon performing of the sensing process, the display panel to display an image based on completion of the sensing process.

10. The display apparatus of claim 1, wherein the at least one controller is further configured to drive, upon skipping of the sensing process, the display panel to display an image based on booting completion.

11. The display apparatus of claim 1, wherein the first input device is one of a remote controller or a button disposed in the display apparatus, and the second input device is a microphone.

12. The display apparatus of claim 1, wherein the second input device is configured to receive a voice command including a wake-up word as the user input for turning on the display apparatus.

13. The display apparatus of claim 1, wherein the display panel displays a first interface content when the user input for turning on the display apparatus is input via the first input device and the display panel displays second interface content different in content from the first interface content when the user input for turning on the display apparatus is input via the second input device.

14. A method for controlling a display apparatus, the method comprising:

determining whether a user input for turning on the display apparatus is received via a first input device or a second input device;

performing a sensing process for sensing electrical characteristics of a plurality of pixels included in a display panel based on the user input for turning on the display apparatus being received via the first input device; and skipping the sensing process based on the user input for turning on the display apparatus being received via the second input device.

15. The method of claim 14, wherein the method further comprises based on the user input for turning on the display apparatus being received via the first input device, determining whether to perform or skip the sensing process based on a length of a power-off period of the display apparatus.

16. The method of claim 15, wherein the determining whether to perform or skip the sensing process comprises:

determining to perform the sensing process based on the power-off period of the display panel being longer than a preset time period.

17. The method of claim 15, wherein the determining whether to perform or skip the sensing process comprises:

determining to skip the sensing process based on the power-off period of the display apparatus being shorter than a preset time period.

18. The method of claim 14, further comprising:

storing, in a storage device, compensation data obtained by performing the sensing process; and driving the display panel based on compensation data that is last stored in the storage device, when skipping the sensing process when the user input for turning on the display is received via the second input device.

19. The method of claim 14, further comprising:

performing the sensing process while the display apparatus is being powered off.

20. The method of claim 14, wherein the first input device is one of a remote controller or a button disposed in the display apparatus, and the second input device is a microphone.

21. The method of claim 14, wherein the second input device is configured to receive a voice command including a wake-up word as the user input for turning on the display apparatus.

* * * * *